(12) United States Patent
Misri et al.

(10) Patent No.: US 12,525,360 B1
(45) Date of Patent: Jan. 13, 2026

(54) SYSTEMS AND METHODS FOR ASSESSING HEALTH MEASUREMENTS FROM FACIAL DATA

(71) Applicant: Hibiscus Health Inc., New York, NY (US)

(72) Inventors: Kavi Misri, New York, NY (US); Anthony Jairam, New York, NY (US)

(73) Assignee: Hibiscus Health Inc., New York, NY (US)

( * ) Notice: Subject to any disclaimer, the term of this patent is extended or adjusted under 35 U.S.C. 154(b) by 0 days.

(21) Appl. No.: 18/999,797

(22) Filed: Dec. 23, 2024

(51) Int. Cl.
*G06V 40/16* (2022.01)
*G06T 5/90* (2024.01)
*G16H 50/30* (2018.01)

(52) U.S. Cl.
CPC .............. *G16H 50/30* (2018.01); *G06T 5/90* (2024.01); *G06V 40/16* (2022.01)

(58) Field of Classification Search
CPC ........... G16H 50/30; G06T 5/90; G06V 40/16
See application file for complete search history.

(56) References Cited

U.S. PATENT DOCUMENTS

| | | | |
|---|---|---|---|
| 2021/0000385 A1* | 1/2021 | Warren | A61B 5/7257 |
| 2024/0041334 A1* | 2/2024 | Devani | A61B 5/1128 |
| 2025/0166409 A1* | 5/2025 | Jeon | G06V 40/15 |
| 2025/0241548 A1* | 7/2025 | Kadambi | A61B 5/02416 |

* cited by examiner

*Primary Examiner* — Phuoc Tran
(74) *Attorney, Agent, or Firm* — DLA Piper LLP (US)

(57) ABSTRACT

A system for assessing a subject's health measurements using dermal imaging is disclosed. The system comprises a processor configured to receive a video data of the subject's face including a dermal region from an imaging device, extract remote photoplethysmography (rPPG) signals from the processed video data using a plane-orthogonal-to-skin method, and determine health measurements based on the rPPG signals using an algorithm. A system for assessing a subject's health measurements using ocular and/or gingival imaging is also disclosed. The system comprises a processor configured to receive images of the subject's face including an ocular region and/or a gingival region from an imaging device, extract signals from the processed images, and determine health measurements based on the signals using a machine learning algorithm.

14 Claims, 13 Drawing Sheets

SERVER 310

- Determine Health Measurements from rPPG signals by Server — 425
- Determine Secondary Health Measurements by Server — 430

COMPUTING DEVICE 115

- Receive Video Recording of Face — 405
- Process Video Recording — 410
- Extract rPPG signals from Dermal Regions of Video Recording — 415
- Transmit rPPG signals to Server — 420

SYSTEMS AND METHODS FOR ASSESSING HEALTH MEASUREMENTS FROM FACIAL DATA

TECHNICAL FIELD

The present disclosure relates generally to methods, systems, and devices related to determining one or more health measurements of a subject based on facial images and/or video.

BACKGROUND

Determining a subject's health measurements, including but not limited to vital signs (e.g., heart rate and blood pressure) and physiological risk factors, is beneficial for detecting health issues and improving overall wellness awareness. Frequent monitoring can improve early detection of health conditions and/or risks therefor as well as timely care to improve outcomes. As such, it is important to conveniently and accurately determine health measurements as part of a regular health assessment.

SUMMARY

A system for assessing one or more health measurements of a subject is provided. The system comprises a processor in electrical communication with an imaging device; and a non-transitory, computer-readable medium storing instructions that, when executed, cause the processor to: receive a video recording of a face of the subject from the imaging device, wherein the video recording captures one or more regions of the face comprising a dermal region, process the video recording to modify graphic properties of the video recording, extract, using a plane-orthogonal-to-skin method, one or more remote photoplethysmography (rPPG) signals related to the subject from the one or more regions of the processed video recording, and determine, using an algorithm, one or more health measurements of the subject based on the one or more rPPG signals.

A computer-implemented method of assessing one or more health measurements of a subject is also provided. The computer-implemented method includes receiving a video recording of a face of a subject from an imaging device, wherein the video recording captures one or more regions of the face comprising a dermal region; processing the video recording to modify graphic properties of the video recording; extracting, using a plane-orthogonal-to-skin method, one or more remote photoplethysmography (rPPG) signals related to the subject from the one or more regions of the processed video recording; and determining, using an algorithm, one or more health measurements of the subject based on the one or more rPPG signals.

A system for assessing one or more health measurements of a subject is also provided. The system comprises a processor in electrical communication with an imaging device; and a non-transitory, computer-readable medium storing instructions that, when executed, cause the processor to: receive one or more images of a face of the subject from the imaging device, wherein each image comprises one or more regions of the face selected from the group comprising an ocular region and a gingival region, process the one or more images to modify graphic properties of the one or more images, extract one or more signals related to the subject from the one or more regions of the one or more processed images, and determine, using a machine learning algorithm, one or more health measurements of the subject based on the one or more signals.

A computer-implemented method of assessing one or more health measurements of a subject is also provided. The computer-implemented: receive one or more images of a face of a subject from an imaging device, wherein each image comprises one or more regions of the face selected from the group comprising an ocular region and a gingival region; process the one or more images to modify graphic properties of the one or more images; extract one or more signals related to the subject from the one or more regions of the one or more processed images; and determine, using a machine learning algorithm, one or more health measurements of the subject based on the one or more signals.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. Various aspects of at least one example are discussed below with reference to the accompanying drawings, which are not intended to be drawn to scale. In the drawings:

FIG. 4 depicts a flow diagram of a method for assessing a health measurement of a subject in accordance with example embodiments.

DETAILED DESCRIPTION

Figure 1:
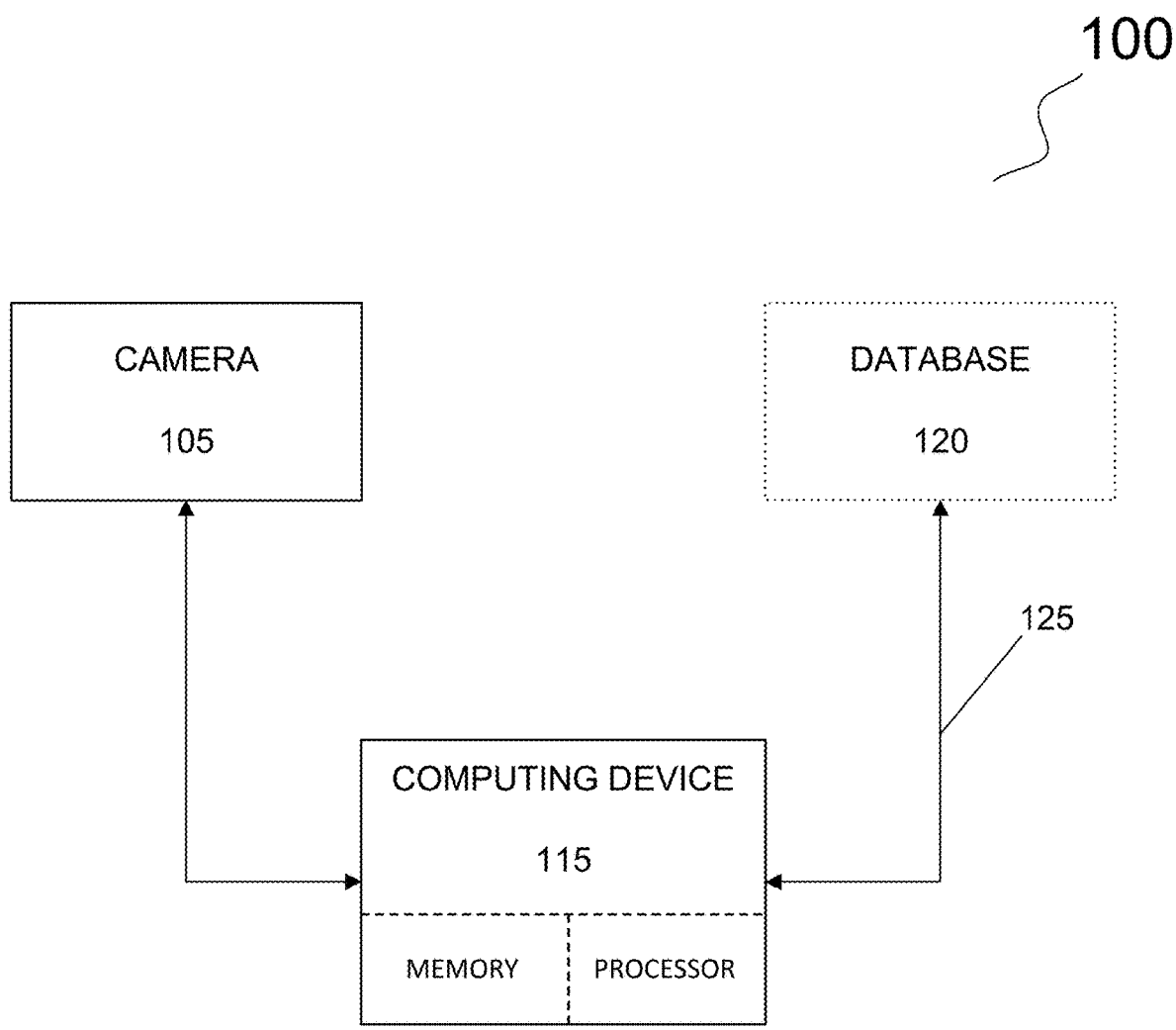
FIG. 1 depicts a block diagram of an exemplary system for assessing a health measurement of a subject using a video recording in accordance with example embodiments.

Traditionally, methods of assessing personal wellness often require specialized equipment or clinical settings, making regular monitoring challenging for many individuals. Accordingly, tools that can use simple imaging of a subject (e.g., with a smartphone or other personal device) to provide health assessments would improve overall awareness of personal wellness.

Currently available systems for assessing health via imaging utilize transdermal optical imaging (TOI) to extract blood flow information from imaging data for calculating health measurements. TOI requires separating images into bit planes (i.e., layers within color channels) to isolate hemoglobin signals while discarding melanin-rich signals. The extracted waveform may be used to calculate vitals, e.g., by utilizing machine learning algorithms. However, this approach requires extensive signal isolation and machine learning-driven pre-processing of the images in order to extract the signals from the imaging data, which can be cumbersome and may result in higher computational loads. Furthermore, because the signals have a fair amount of noise (e.g., due to variations in skin tone), the TOI method is focused on reducing noise while retaining a strong signal, which may come at the cost of accuracy in the health measurements.

Accordingly, it would be advantageous to have a system capable of operating on a smartphone that enables accurate, accessible, convenient, and non-invasive testing to enhance awareness of personal wellness.

One or more techniques disclosed herein address the deficiencies of conventional system by providing an approach for determining health measurements of a subject in a non-invasive manner. Ideally, the system would be compatible with widely available electronics, e.g., a smartphone or other smart device, and could utilize the smart device's camera to receive images of the subject in order to simplify the requirements and cost associated with monitoring vitals and/or health conditions. Accordingly, it is contemplated that the system may include software operating as a mobile application on a smartphone and utilizing the smartphone's camera to collect imaging data from the subject. In some embodiments, the system for assessing health measurements may utilize facial images and/or video of the subject. While dermal regions of the face may be useful for extracting remote photoplethysmography (rPPG) signals, the system may further utilize ocular (e.g., iris) regions and/or gingival regions to offer more comprehensive and/or more accurate assessment of health measurements.

The systems and methods disclosed herein enhance personal wellness awareness through non-invasive vital sign measurements. The disclosed systems conveniently enable facial imaging to be completed using a smartphone camera, from which physiological signals (e.g., rPPG) can be extracted to assess vital signs and other health indicators for a subject. Accordingly, by leveraging ubiquitous smartphone technology, the disclosed systems and methods enable health monitoring to be performed in real-time without requiring a particular setting, specialized equipment, or invasive methods. This accessibility may lead to more frequent monitoring, which may improve early detection of health issues and overall wellness awareness.

Furthermore, unlike previous attempts to solve this issue, the systems and methods disclosed herein are optimized to accurately estimate vital signs such as heart rate, breathing rate, and blood pressure despite significant variations in lighting, skin tones, or facial expression and movements, thereby maintaining high precision even under challenging conditions. Accordingly, the disclosed systems and methods enable reliable and consistent readings in real-world environments.

System for Assessing Health Measurements Using Facial Imaging Data

FIG. 1 is a block diagram of an exemplary system 100 for assessing health measurements using facial imaging data is depicted in accordance with example embodiments. The system 100 may include a camera 105 and a computing device 115. The camera 105 may be configured to capture a video recording of a face of a subject. The camera 105 may be in electrical communication with the computing device 115. In some embodiments, the system 100 may further include an external database 120 in operable communication with the computing device 115.

The camera 105 may include a complementary metal-oxide semiconductor (CMOS) sensor and/or a charge-coupled device (CCD) type cameras. In some embodiments, the camera 105 may be integrated with the computing device 115, such as in the form of a smartphone and its camera. It should be understood that the camera 105 may be representative of additional types of sensors that are conventionally utilized in smartphones and other smart devices as would be known to a person having an ordinary level of skill in the art. In some embodiments, the camera 105 may be representative of a front-facing camera of a device (e.g., a "selfie" camera for a smartphone or tablet). In some embodiments, the camera 105 may be representative of a rear-facing camera of a device (e.g., smartphone or tablet), which may offer a higher resolution than a front-facing camera.

The camera 105 generally includes a lens. In some embodiments, lens may be a fixed focus lens, an optical zoom lens, a telephoto lens, and/or a wide angle lens. It should be understood that the camera lens may be representative of additional types of lenses that are conventionally utilized in smartphones and other smart devices as would be known to a person having an ordinary level of skill in the art.

In some embodiments, the image sensor and camera lens of camera 105 are in optical communication. For example, the camera lens may be aligned with the image sensor such that an optical axis of the camera lens is coincident or co-extensive with an optical axis of the sensor. As such, light reaching the camera lens may be modified by diffraction through the camera lens before reaching the sensor, and thus imaging data (e.g., images and/or video) obtained by the camera 105 may be modified by the camera lens.

In some embodiments, the camera 105 may provide a resolution of at least about 720 p (1280×720 pixels). In some embodiments, the camera 105 may provide higher resolutions, e.g., about 900 p, about 1080 p, about 2160 p, greater than about 2160 p, or additional values or ranges therebetween. In some embodiments, the resolution may be measured in megapixels. For example, the camera 105 may provide a resolution of at least 1 MP. In some embodiments, the camera 105 may provide higher resolutions, e.g., about 1.5 MP, about 2 MP, about 4 MP, about 8 MP, about 12 MP, about 16 MP, greater than about 16 MP, or additional values or ranges therebetween. In embodiments that utilize ocular and/or gingival facial regions in calculations as further described herein, a higher resolution may be utilized, e.g., at least about 8 MP, about 12 MP, about 16 MP, greater than about 16 MP, or additional values or ranges therebetween. The improved resolution may serve to enhance the accuracy and/or reliability of vital sign measurements, particularly for complex metrics such as blood pressure or metabolic health indicators. In some embodiments, the camera 105 may capture video at a frame rate of at least about 29 frames per second (fps). However, additional frame rates are contemplated herein, e.g., about 30 fps, about 60 fps, greater than about 60 fps, or individual values or ranges therebetween.

The computing device 115 may be in communication with the camera 105 in order to receive imaging data of the face of the subject collected by the camera 105. Computing device 115 may process the imaging data as further described herein. In some embodiments, the computing device 115 includes a processor and a memory such as a non-transitory, computer-readable medium storing instructions for processing the imaging data. It should be understood that the computing device 115 may include any number of components of a computing device as would be known to a person having an ordinary level of skill in the art for communication, processing, and powering the system 100.

In some embodiments, the computing device 115 may be a smartphone. In some embodiments, the camera 105 may be integrated with the computing device 115. Accordingly, a software application on the smartphone may be executed in the form of a mobile application to receive and process the imaging data as further described herein.

In some embodiments, the computing device 115 may be representative of other types of devices having some or all of the described features and/or functions, e.g., a tablet, a laptop computer, an action camera (e.g., a GoPro device), a virtual reality headset, an augmented reality headset, and additional types of devices as would be known to a person having an ordinary level of skill in the art.

It should be understood that where the present disclosure makes reference to the use of a smartphone, it is equally contemplated that other types of devices as disclosed herein may be utilized in place of the smartphone. Furthermore, in additional embodiments, the computing device 115 may be a separate and distinct component from the camera 105. Accordingly, a communications unit (e.g., wired or wireless communication) may be used to transmit imaging data collected by the camera 105 to the computing device 115 for processing.

The computing device 115 may have a minimum computational power sufficient to perform the image processing and/or analysis of the imaging data as further described herein. For example, the computing device 115 may be rated in terms of conventionally known computer benchmarks as would be known to a person having an ordinary level of skill in the art, e.g., a 'single thread performance' rating (i.e., performance per thread). In some embodiments, the computing device 115 may have a single thread performing rating of at least about 600. However, higher single thread performance ratings may be utilized to improve the handling of complex real-time image processing algorithms, e.g., a single thread performing rating of at least about 600, about 700, about 800, about 900, about 1000, about 1250, about 1500, about 2000, about 2500, greater than about 2500, or individual values or ranges therebetween.

In some embodiments, the system 100 may further include a database 120. For example, the database 120 may include information related to features and/or patterns associated with various vital signs, health conditions, medical states, and/or symptoms thereof. In some embodiments, the database 120 may be stored on the memory of computing device 115 or another location accessible to the computing device 115, e.g., a remote database, cloud server, or another external computing device. The computing device 115 may compare signals extracted from the imaging data to the information in the database 120 to assess health measurements. For example, the computing device 115 may identify features in the images and/or provide information related to a vital sign or a health condition.

The computing device 115 may be in communication with database 120 via one or more communication channels 125. In some embodiments, the one or more communication channels 125 may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, Zig-Bee™, ambient backscatter communication (ABC) protocols, USB, WAN, or LAN.

Methods for Assessing Health Measurements Using rPPG Signals

Figure 2A:
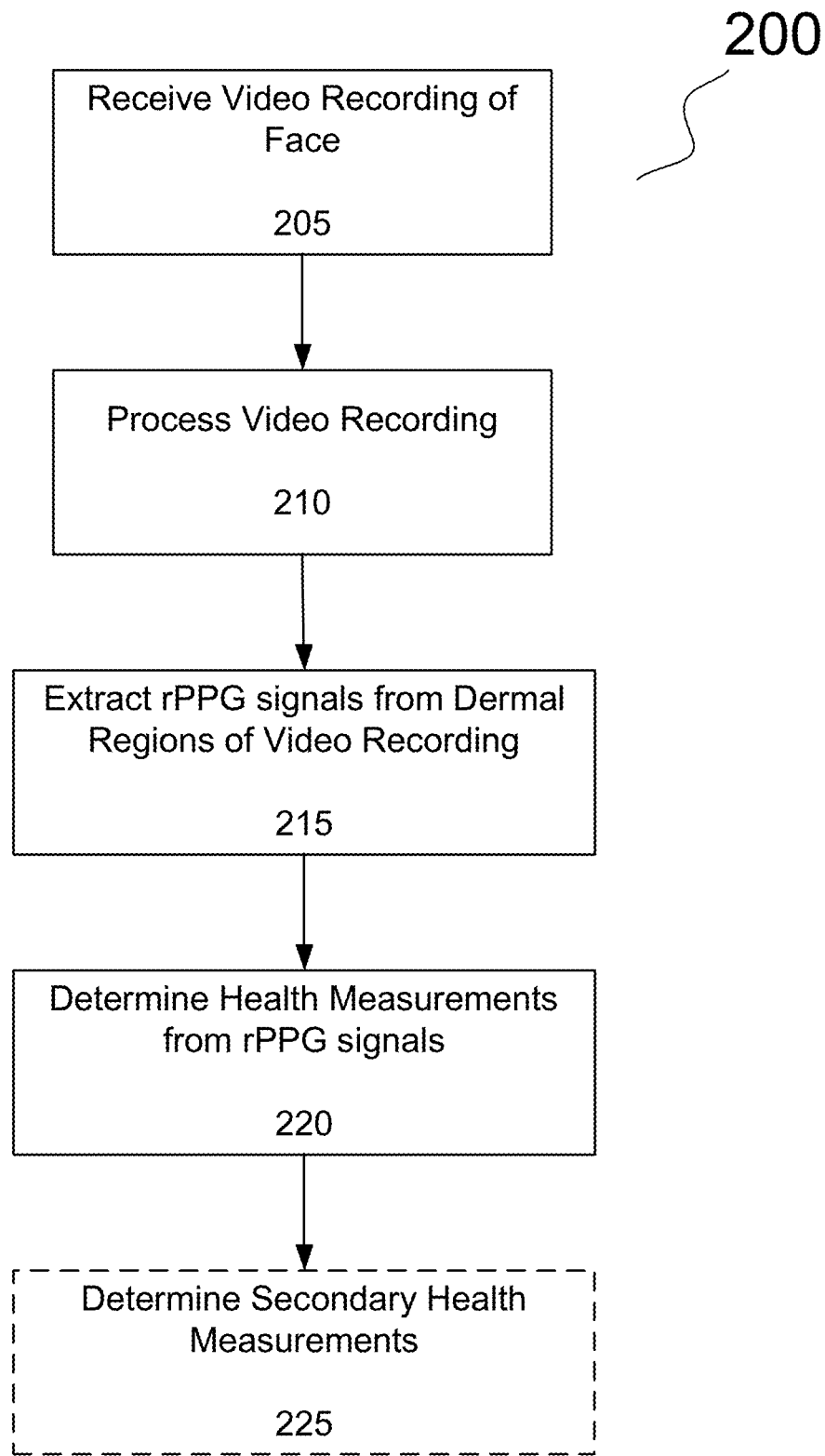
FIG. 2A depicts a flow diagram of an illustrative method for assessing a health measurement of a subject in accordance with example embodiments.

FIG. 2A is a flow diagram of an illustrative method 200 for assessing a health measurement of a subject in accordance with example embodiments. For example, the method 200 may be carried out by computing device 115 upon execution of the instructions stored on the memory.

At step 205, computing device 115 may receive video data of a face of a subject from camera 105. In some embodiments, the video data is a recording or stream of at least about 30 seconds in length. However, a shorter length of recording (e.g., about 10 seconds, about 15 seconds, about 20 seconds, or about 25 seconds) may be suitable in some embodiments. Likewise, a longer length of video (e.g., about 45 seconds, about 1 minute, about 2 minutes, or greater than about 2 minutes) may be captured to provide additional imaging data for extraction of signals. It should be understood that the computing device 115 may receive video data (i.e., a series of 'frames'), but may also utilize a series of continuous images (e.g., a series of 'burst' images) in a similar manner. In some embodiments, the method 200 is performed using a plurality of video recordings or streams of the face.

In some embodiments the video data may include one or more regions of the face. In some embodiments, the one or more regions includes a dermal region (i.e., skin) of the face. As would be understood by a person having an ordinary level of skill in the art, dermal regions of the face may display features indicative of rPPG signals of the subject. In some embodiments, the video data may include a plurality of dermal regions of the face. In additional embodiments, the video data may include additional regions of the face that may be useful in determining one or more health measurements. For example, the video data may include an ocular region of the face, e.g., an eye region such as an iris region. In another example, the video data may include gingival region of the face, i.e., the gumline. The ocular region and/or the gingival region may be useful in conjunction with the dermal region(s) for calculating the one or more health measurements to a greater degree of accuracy. Likewise, the inclusion of the ocular region and/or the gingival region may enable calculation of additional health measurements as further described herein.

Figure 2B:
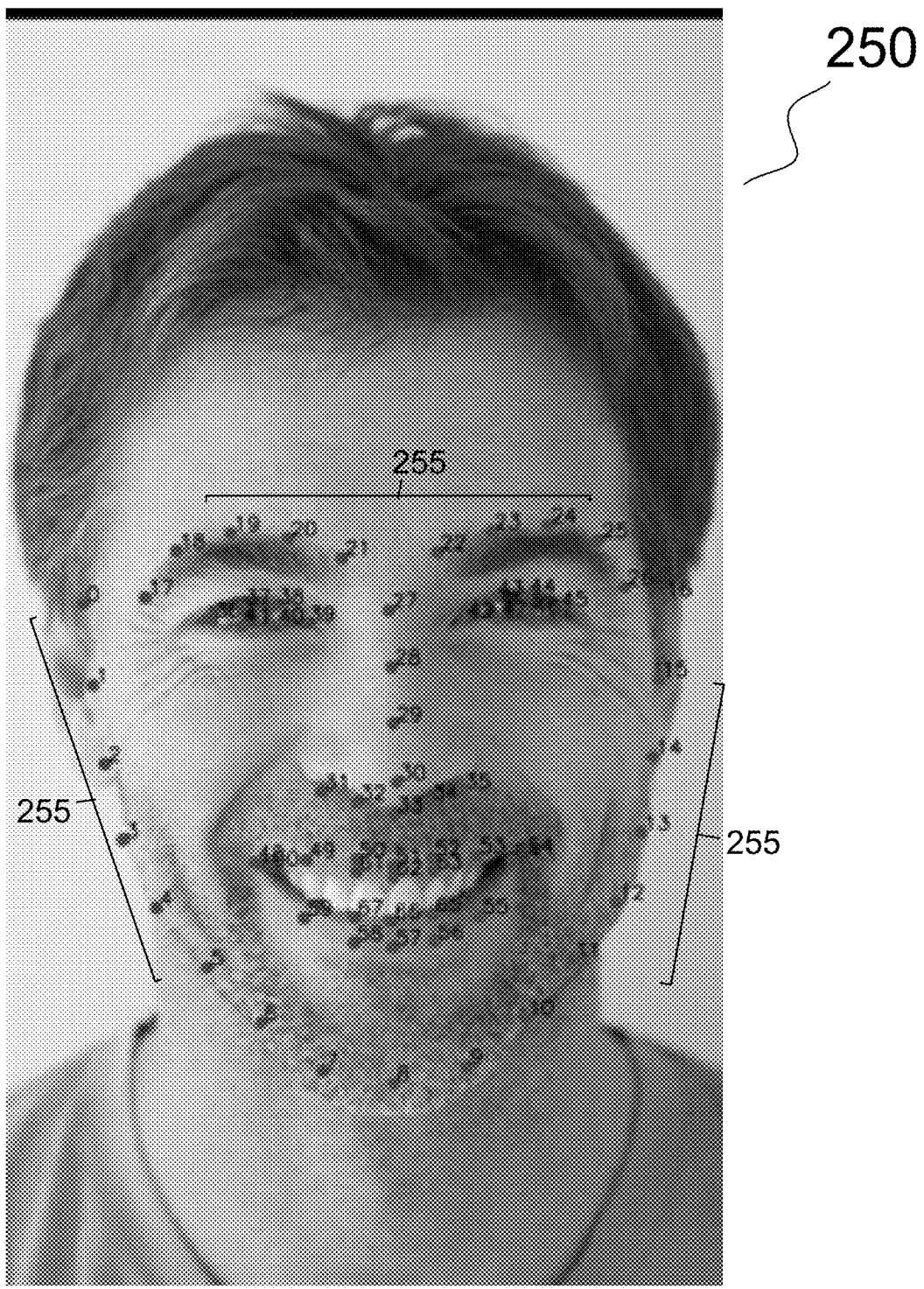
FIGS. 2B-2C depict an exemplary facial image masking process in accordance with example embodiments.
Figure 2C:
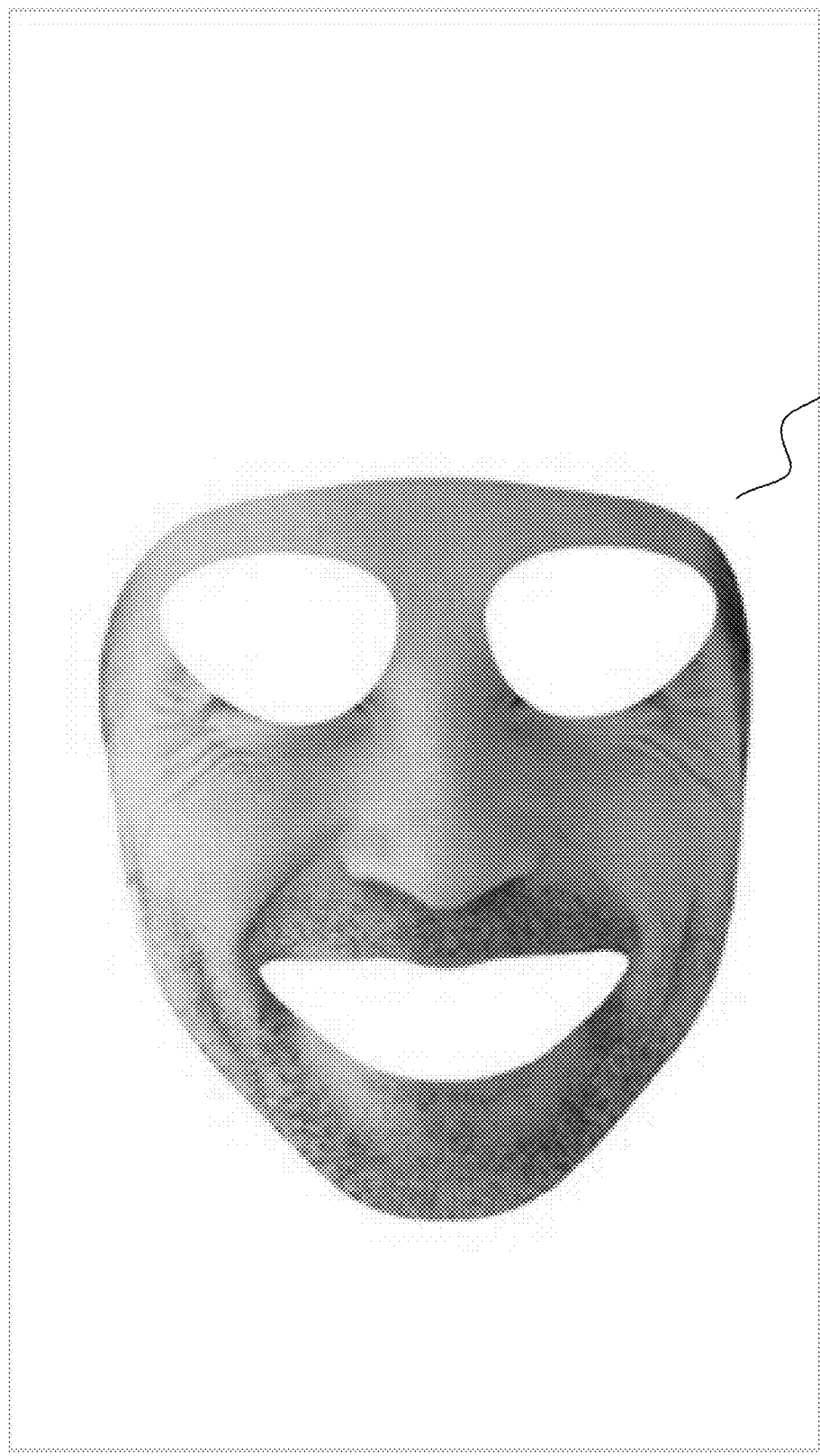

At step 210, computing device 115 may process the video data. In some embodiments, processing the video data may include modifying one or more graphic properties of the video recording. In some embodiments, computing device 115 may process the video data by adjusting a resolution of the video data. For example, the resolution is adjusted to about 720 p. However, additional resolutions are contemplated herein, e.g., about 900 p, about 1080 p, about 2160 p, or individual values or ranges therebetween. In some embodiments, the computing device 115 may process the video data by adjusting a frame frate of the video recording. For example, the frame rate is adjusted to about 29 frames per second (fps). However, additional frame rates are contemplated herein, e.g., about 30 fps, about 60 fps, greater than about 60 fps, or individual values or ranges therebetween. In some embodiments, the computing device 115 may process the video data by masking one or more portions of the video recording. FIGS. 2B-2C depict an exemplary facial image masking process in accordance with example embodiments. For example, one or more portions of the video data may be masked in order to isolate one or more regions of interest, e.g., a dermal region, an ocular region, and/or a gingival region. For example, areas outside the one or more regions of interest may be masked in each frame, thereby isolating the one or more regions of interest in each frame of the processed video recording and simplifying the imaging data for the extraction of signals. As shown in FIG. 2A, a facial image 250 may be processed by detecting and mapping a plurality of facial landmarks 255 thereon. For example, in FIG. 2A, a set of landmarks 255 labeled with numbers 0-67 are applied around the contour of the face, around the eyes, and around the mouth on the facial image 250. As shown in FIG. 2B, one or more regions may be removed from the facial image 250 to result in a masked image 260. For example, the eyes and mouth regions may be excluded while retaining surround dermal regions from which rPPG signals may be extracted as described herein. In some embodiments, the computing device 115 may adjust the resolution to about 720 p, the frame rate to about 29 fps, and may mask one or more portions of the video recording to isolate at least a dermal region of the face in each frame.

At step 215, computing device 115 may extract one or more rPPG signals from the video recording. In some embodiments computing device 115 may use a first signal processing algorithm to extract one or more rPPG signals from the one or more regions of the face (i.e., at least the dermal region) in the processed video recording. In some embodiments, the first signal processing algorithm may be representative of a plane-orthogonal-to-skin (POS) method.

In some embodiments, computing device 115 may extract one or more rPPG signals from the video recording by transforming color information in the video recording, normalizing motion and/or lighting in the transformed color information, and combining the color information. In some embodiments, computing device 115 may transform the color information or color signals in the video recording to emphasize changes in the color information related to a heart pulse of the subject. In some embodiments, computing device 115 may normalize the transformed color signals to reduce the effects of motion and lighting changes in the video recording on the color signals. In some embodiments, computing device 115 may combine the transformed, normalized color signals to maximize information in the color signals related to the subject's pulse while reducing or minimizing noise in the color signals. In some embodiments, the computing device 115 may transform the color signals to emphasize changes in the color information related to a heart pulse of the subject, may normalize the transformed color signals to reduce the effects of motion and lighting changes, and may combine the transformed, normalized color signals to maximize pulse information and reduce noise. Additional detail regarding the POS method is described in the article entitled "Algorithmic Principles of Remote PPG" by W. Wang et al., in *IEEE Transactions on Biomedical Engineering* (64 (7), 1479-1491 July 2017, doi: 10.1109/TBME.2016.2609282), which is hereby incorporated by reference in its entirety.

Figure 2D:
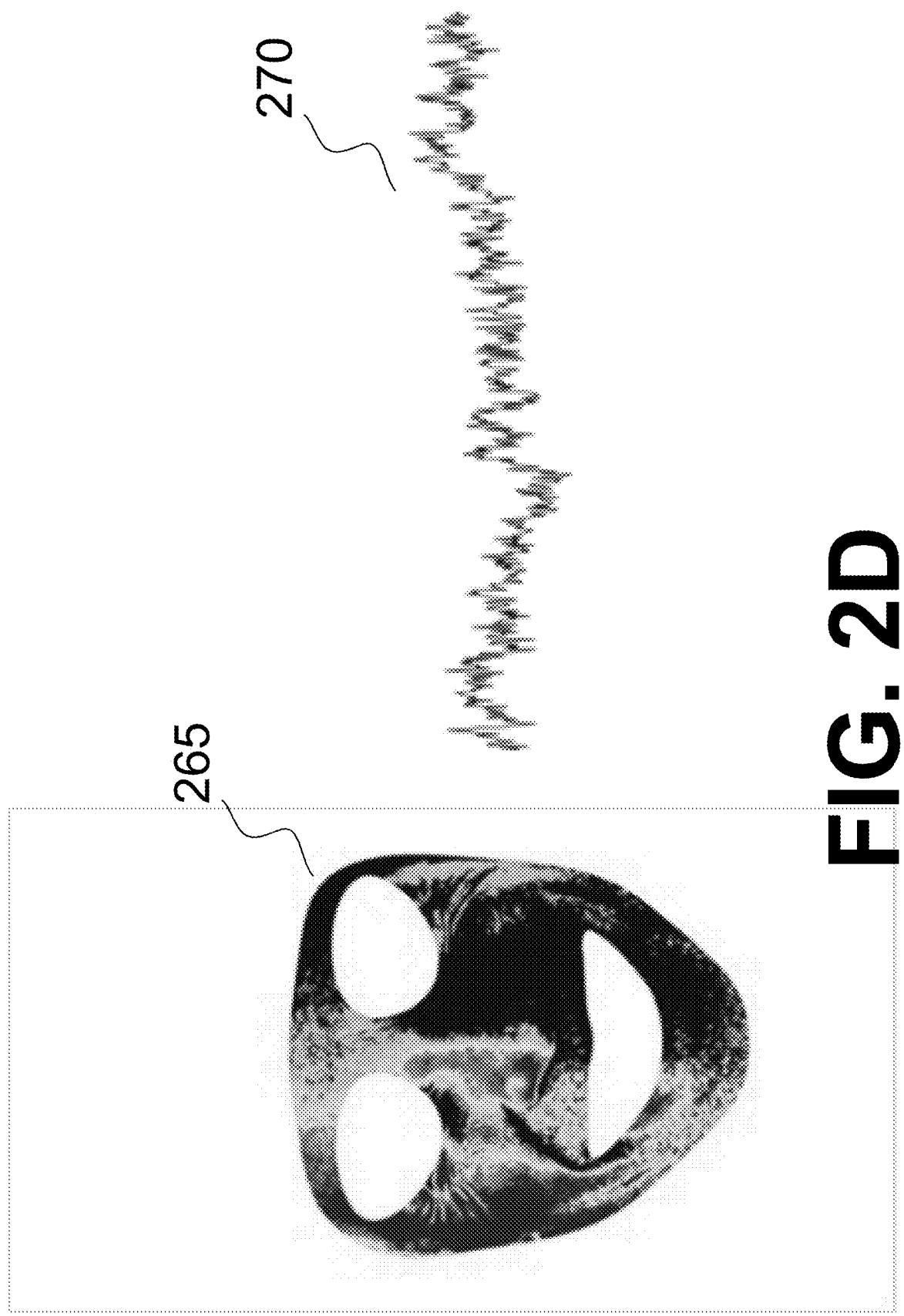
FIG. 2D depicts an exemplary visualization of real-time remote photoplethysmography signal extraction from a facial image using the described methods in accordance with example embodiments.

FIG. 2D depicts an exemplary visualization of real-time remote photoplethysmography signal extraction from a facial image using the described methods in accordance with example embodiments. As described above, a spatial representation 265 of the POS signal intensity may be generated and mapped onto a single video frame. In the spatial representation 265, color variations may indicate different signal strengths across facial regions, e.g., in the form of a heat map on the video frame. Furthermore, a raw PPG waveform 270 may be extracted from the processed regions of the facial image. The raw PPG waveform may demonstrate temporal blood volume variations in the regions of the facial image.

The approach to extracting the one or more rPPG signals as described herein may be distinguished from prior attempts involving transdermal optical imaging (TOI). The POS method for rPPG extraction enables direct extraction of high-quality rPPG signals without the need for additional signal isolation and machine learning-driven preprocessing required by TOI. Additionally, the extracted rPPG signals may also be supplemented by signals extracted from non-dermal regions such as the eye and/or gumline as further described herein. This combination of signals offers a significant advantage because it enables additional calculations that enhance the accuracy and robustness of vital predictions over conventional methods.

At step 220, the computing device 115 may determine one or more health measurements for the subject from the extracted one or more rPPG signals. The health measurements may be determined using one or more algorithms. For example, in some embodiments, a first algorithm may be used to identify one or more patterns in the rPPG signals indicative of a condition of the subject and a second algorithm may be used to determine a health measurement based on the one or more patterns. In additional embodiments, a single algorithm may be utilized to determine a health measurement or multiple health measurements. In some embodiments, the one or more health measurements may include a heart rate of the subject. In some embodiments, computing device 115 may determine a heart rate of the subject using a second signal processing algorithm. In some embodiments, the second signal processing algorithm may employ Welch's method. Welch's method is a known approach for spectral density estimation involving converting a signal from the time domain to the frequency domain. In particular, Welch's method may be effective at reducing noise in a set of estimated power spectra.

In some embodiments, computing device 115 may break the rPPG signal into smaller portions when determining the one or more health measurements using the second signal processing algorithm. In some embodiments, the portions of the rPPG signal overlap one another.

In some embodiments, computing device 115 may analyze a frequency of each portion of the rPPG signal to determine the one or more health measurements. For example, computing device 115 may analyze each portion of the rPPG signal to determine how often the signal repeats in order to assess its frequency. In some embodiments, computing device 115 may perform pre-processing steps to assist in determining the one or more health measurements. For example, computing device 115 may reduce noise in the rPPG signal by combining the results (e.g., the analyzed frequency) from the portions of the rPPG signal. Combining the results from each portion reduces the overall noise in the results and provides a clearer picture of a true pulse rate of the subject. Computing device 115 may then identify a heart rate within the combined results.

In some embodiments, identifying a heart rate includes the computing device 115 identifying a strongest pulse pattern within a range of normal heart rates. In some embodiments, the range of normal heart rates may be 45 beats per minute (BPM) to 240 BPM. However, additional ranges reflecting typical heart rates for a subject may be utilized herein as would be known to a person having an ordinary level of skill in the art. Upon identifying the strongest pulse pattern in the signal, the computing device 115 may convert the pulse pattern into beats per minute to be output as a heart rate. Additional detail regarding the Welch's method is described in the article entitled "The Use of Fast Fourier Transform for the Estimation of Power Spectra: A Method Based on Time Averaging Over Short, Modified Periodograms" by Welch et al., in *IEEE Transactions on Audio and Electroacoustics* (15 (2), 70-73, January 2003, doi: 10.1109/TAU.1967.1161901), which is hereby incorporated by reference in its entirety.

In some embodiments, method 200 may include step 225. At step 225, the computing device 115 may determine one or more additional health measurements ("secondary" health measurements) based on a determined heart rate as well as the facial video recording, e.g., by extracting additional signals therefrom and/or processing the rPPG signals in additional manners. In some embodiments, the additional signals are extracted from the dermal region(s) utilized in steps 210 and 215. Furthermore, the additional signals may alternatively or additional be extracted from ocular regions (e.g., an iris region) and/or gingival regions of the face. In some embodiments, the one or more additional health measurements are selected from the group consisting of hemoglobin A1C (HbA1C) level, HbA1C risk, blood pressure, systolic blood pressure, diastolic blood pressure, oxygen saturation ($SpO_2$), pulse rate, breathing rate, respiration rate, heart rate variability, irregular heartbeat count, body mass index (BMI), cardiovascular disease risks, heart attack risk, stroke risk, hypertension risk, diabetes risk (e.g., Type 2 diabetes), and metabolic health factors.

The approach to determining the one or more health measurements as described herein may be distinguished from prior attempts involving transdermal optical imaging (TOI). The use of Welch's method for determining health measurements enables accurate calculations that are less affected by noise, thereby limiting the need for additional signal isolation and pre-processing required by conventional methods.

In some embodiments, the computing device 115 may determine the one or more health measurements in substantially real time. In some embodiments, the determination (e.g., step 220) may occur on the computing device 115. However, in some embodiments, where a network connection is available and connected, the determination may occur over a server or another external source (i.e., online mode).

Figure 3:
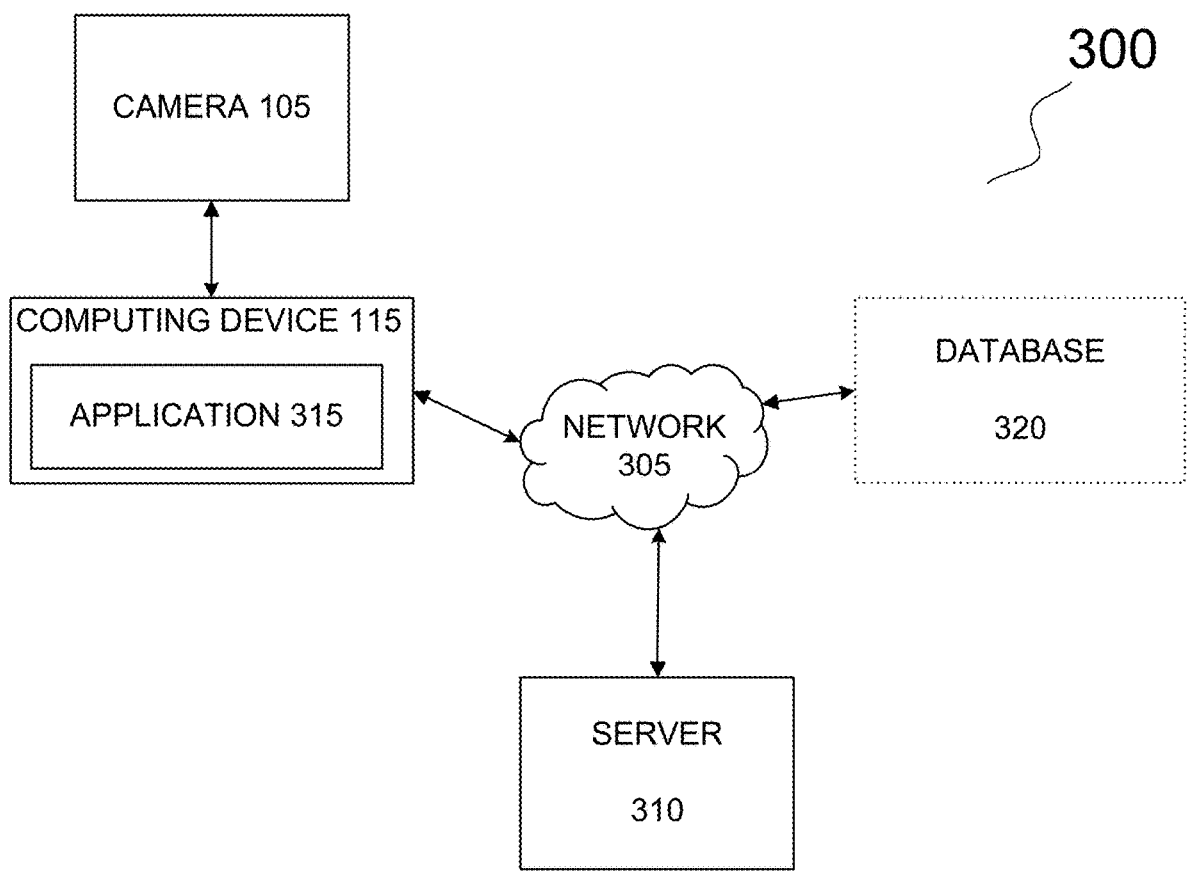
FIG. 3 depicts a network within which a system for assessing a health measurement may operate in accordance with example embodiments.

FIG. 3 depicts a system 300 in accordance with example embodiments. System 300 may include computing device 115 communicating with server 310 via a network 305.

Network 305 may be of any suitable type, including individual connections via the Internet, such as cellular or Wi-Fi networks. In some embodiments, network 305 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 305 may include any type of computer networking arrangement used to exchange data. For example, network 305 may be the Internet, a private data network, virtual private network using a public network and/or other suitable connection(s) that enables components in system 300 to send and receive information between the components of system 300.

Computing device 115 may include an application 315 executing thereon. Application 315 may be representative of an application associated with server 310. In some embodiments, application 315 may be a standalone application associated with server 310, such as a mobile application, tablet application, desktop application, or, more generally, a software application affiliated with an entity associated with server 310. In some embodiments, application 315 may be representative of a web browser configured to communicate with server 310, such that an end user may gain access to functionalities of server 310 via a web browser. More generally, application 315 may be configured to provide an interface between computing device 115 and server 310 for the purpose of allowing a user to access functionality of server 310.

Server 310 may be representative of one or more servers configured to communicate with one or more devices, such as computing device 115. In some embodiments, server 310 may be configured to host one or more virtualization elements (e.g., virtual machines or containers), such that components of server 310 may be upscaled or downscaled, depending on demand or user request. In some embodiments, the server 310 may be representative of a server that supports or exists within a cloud environment.

In some embodiments, system 300 may further include a database 320 in communication with the server 310. In some embodiments, the database 320 may be substantially similar to database 120 described above in conjunction with FIG. 1. The database 320 may include data from clinical testing and additional information used to train an algorithm as further described herein. In some embodiments, the database 320 stores information related to features or patterns of interest, e.g., sample signals, patterns, characteristics, and the like that may be identified in facial images. In some embodiments, the database 320 includes a library of known features or patterns. The known features or patterns may be documented and/or known to be associated with particular vitals, conditions, states, or risk factors for the patient, e.g., through research and/or assessment of images from historical patients. In some embodiments, the database 320 further includes a library of images from historical patients, which may be used for training and/or comparison as further described herein.

In operation, the server 310 may receive data from the computing device 115 and/or the database 320 in order to determine a health measurement for the subject such as that described in more detail below.

FIG. 4 is a flow diagram of an illustrative method 400 for assessing a health measurement of a subject in accordance with example embodiments.

At step 405, the computing device 115 may receive a video recording of a face of a subject from camera 105. In some embodiments, the video recording is at least about 30 seconds in length. However, a shorter length of recording (e.g., about 10 seconds, about 15 seconds, about 20 seconds, or about 25 seconds) may be suitable in some embodiments. Likewise, a longer length of recording (e.g., about 45 seconds, about 1 minute, about 2 minutes, or greater than about 2 minutes) may be captured to provide additional imaging data for extraction of signals. It should be understood that the computing device 115 may receive a video recording (i.e., a series of 'frames'), but may also utilize a series of continuous images (e.g., a series of 'burst' images) in a similar manner. In some embodiments, the method 400 is performed using a plurality of video recordings of the face. It should be understood that step 405 is substantially similar to step 205 of the method 200 and may include any of the features or processes as described with respect to step 205.

At step 410, computing device 115 may process the video recording. In some embodiments, processing the video recording may include modifying one or more graphic properties of the video recording. In some embodiments, computing device 115 may process the video recording by adjusting a resolution of the video recording, adjusting a frame frate of the video recording, and/or masking one or more portions of the video recording. In some embodiments, the computing device 115 may adjust the resolution to about 720 p, adjust the frame rate to about 29 fps, and may mask one or more portions of the video recording to isolate at least a dermal region of the face in each frame. It should be understood that step 410 is substantially similar to step 210 of the method 200 and may include any of the features or processes as described with respect to step 210.

At step 415, computing device 115 may extract one or more rPPG signals from the video recording. In some embodiments, computing device 115 may use a first signal processing algorithm to extract one or more rPPG signals from the one or more regions of the face (i.e., at least the dermal region) in the processed video recording. In some embodiments, the first signal processing algorithm may be representative of a plane-orthogonal-to-skin (POS) method. It should be understood that step 415 is substantially similar to step 215 of the method 200 and may include any of the features as described with respect to step 215.

At step 420, computing device 115 may transmit the extracted rPPG signals to the server 310. In some embodiments, the computing device 115 may transmit the rPPG signals via network 305. In some embodiments, the extracted rPPG signals are transmitted while the video data is retained at computing device 115. In some embodiments, the video data is deleted by the computing device 115.

At step 425, the server 310 may determine one or more health measurements for the subject from the extracted one or more rPPG signals. The health measurements may be determined using one or more algorithms. For example, in some embodiments, a first algorithm may be used to identify one or more patterns in the rPPG signals indicative of a condition of the subject and a second algorithm may be used to determine a health measurement based on the one or more patterns. In additional embodiments, a single algorithm may be utilized to determine a health measurement or multiple health measurements. In some embodiments, the one or more health measurements may include a heart rate of the subject. In some embodiments, the server 310 may determine a heart rate of the subject using a second signal processing algorithm. In some embodiments, the second signal processing algorithm may employ Welch's method. It should be understood that step 425 is substantially similar to step 220 of the method 200 and may include any of the features as described with respect to step 220.

In some embodiments, server 310 may employ a machine learning algorithm and/or a deep learning model for determining the one or more health measurements. For example, the server 310 may host a convolutional neural network (CNN). However, it should be understood that additional types of machine learning algorithms and/or deep learning models capable of processing image based data may be utilized as would be known to a person having an ordinary level of skill in the art. In some embodiments, the server 310 utilizes the CNN to identify one or more patterns in the one or more rPPG signals and further to determine the one or more health measurements based on the one or more patterns. Additional details related to implementing and training a machine learning algorithm and/or a machine learning model are further described herein.

In some embodiments, method 400 may include step 430. At step 430, the server 310 may determine one or more additional health measurements for the subject based on the determined health measurement(s) and the one or more regions of the face. In some embodiments, the server 310 may determine the additional health measurements based on a determined heart rate as well as the facial video recording, e.g., by extracting additional signals therefrom and/or processing the rPPG signals in additional manners. In some embodiments, the additional signals are extracted from the dermal region(s) utilized in steps 410 and 415 of the method 400. Furthermore, the additional signals may alternatively or additional be extracted from ocular regions (e.g., an iris region) and/or gingival regions of the face. In some embodiments, the one or more additional health measurements are selected from the group consisting of hemoglobin A1C (HbA1C) level, HbA1C risk, blood pressure, systolic blood pressure, diastolic blood pressure, oxygen saturation ($SpO_2$), pulse rate, breathing rate, respiration rate, heart rate variability, irregular heartbeat count, body mass index (BMI), cardiovascular disease risks, heart attack risk, stroke risk, hypertension risk, diabetes risk (e.g., Type 2 diabetes), and metabolic health factors.

It should be understood that the extraction of additional signals as described serves to enhances the accuracy of calculations, for example with respect to risk assessments. Accordingly, the system may provide a more comprehensive health risk assessment beyond the classical vital signs (e.g., heart rate). For example, incorporation of ocular and or gingival facial data may provide additional data points for determination of the various health measurements. For example, research indicates that periodontal disease suggests a higher risk of serious cardiovascular events, such as strokes or heart attacks. Likewise, the appearance of the iris may correlate with vitals such as blood pressure as well as other systemic conditions. Consequently, analysis of the subject's gum line for oral health indicators and/or the subject's iris for systemic health indicators may impact calculations of various risk factors.

In some embodiments, the additional algorithms may include one or more machine learning algorithms and/or deep learning models. For example, the computing device 115 may utilize a convolutional neural network (CNN). However, it should be understood that additional types of machine learning algorithms and/or deep learning models may be utilized as would be known to a person having an ordinary level of skill in the art, e.g., a neural network, a deep learning network, a support vector machine, a generative adversarial network, a reinforcement learning model, MobileNet, random forest, extreme gradient boosting (XG-Boost), Long Short-term Memory (LSTM), and the like. The CNN may generate a risk threshold for various health indicators. In some embodiments, the computing device 115 utilizes the CNN to identify one or more patterns in the one or more signals extracted from the facial video recording that are indicative of a condition of the subject. Furthermore, the computing device 115 may utilize the CNN to determine the one or more additional health measurements based on the one or more patterns. In some embodiments, determining the one or more additional health measurements is based further on the determined health measurements in step 220 of the method 200 (e.g., heart rate). For example, heart rate may be used as part of a calculation of cardiovascular risk factors, including a risk of heart attack, a risk of stroke, heart rate variability, pulse rate, and other wellness-related metrics. It should be understood that while the secondary health measurements are not entirely dependent on heart rate, heart rate may be used to validate or confirm certain calculations and/or to enhance the accuracy of predictions. For example, calculation of vitals like HbA1C, triglycerides, and cholesterol may utilize heart rate for confirming or improving the accuracy of the calculation. Using a multi-factor approach as described ensures that the determined health measurements are based on a broader set of physiological indicators rather than relying on any single indicator.

Method for Assessing Health Measurements Using Eye and/or Gumline Data

Figure 5A:
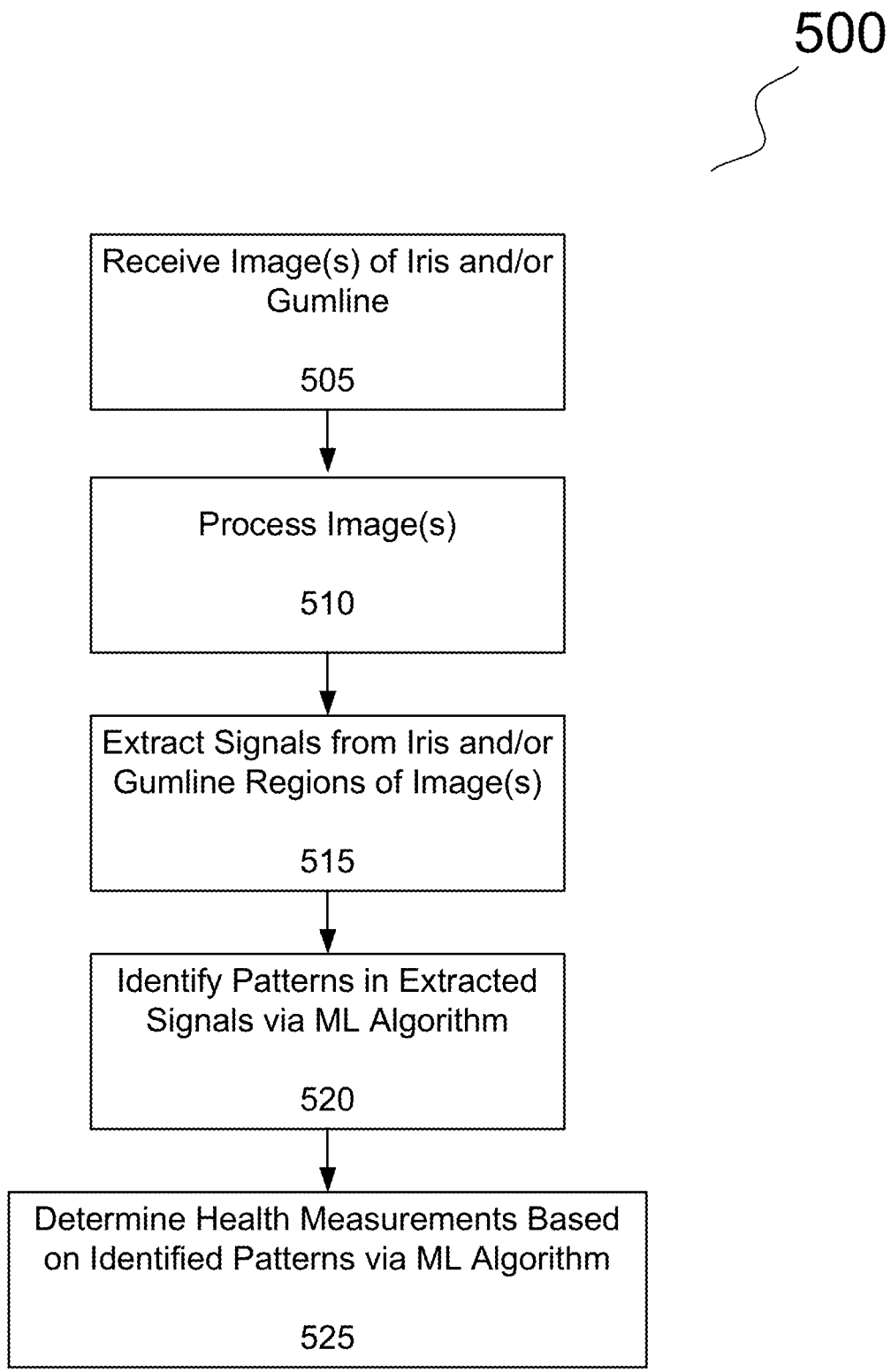
FIG. 5A depicts a flow diagram of a method for assessing a health measurement of a subject using images of the eye and/or gumline in accordance with example embodiments.

FIG. 5A is a flow diagram of an illustrative method 500 for assessing a health measurement of a subject using eye and/or gumline data in accordance with example embodiments.

At step 505, server 310 may receive one or more images of a face of a subject. In some embodiments, server 310 may receive the one or more images from computing device 115. In some embodiments, server 310 may receive the one or more images from camera 105. The one or more images may include one or more regions of the face, e.g., an ocular region (such as at least an iris region) and/or a gingival region (i.e., a gumline region). In some embodiments, the one or more images may include close-up images of the eye and/or gumline of the subject. In additional embodiments, the one or more images may be images of a larger portion or substantially the entirety of the face of the subject which include at least a portion of the eye (e.g., the iris) and/or the gumline. It should be understood that while the present disclosure makes reference to one or more images, the system 300 may alternatively utilize one or more video recordings and/or a series of continuous images (e.g., a series of 'burst' images) that include at least a portion of the eye (e.g., the iris) and/or the gumline in the same general manner described herein. In some embodiments, the one or more regions of the face may additionally include a dermal region (i.e., skin) of the face that may be useful in conjunction with the ocular and/or gingival regions for calculating the one or more health measurements to a greater degree of accuracy.

Figure 5B:
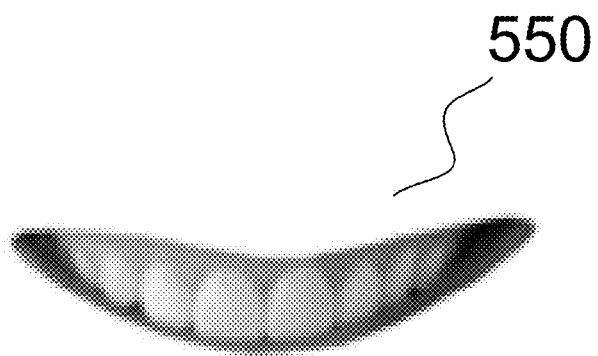
FIGS. 5B-5C depict an exemplary facial image masking process in accordance with example embodiments.
Figure 5C:
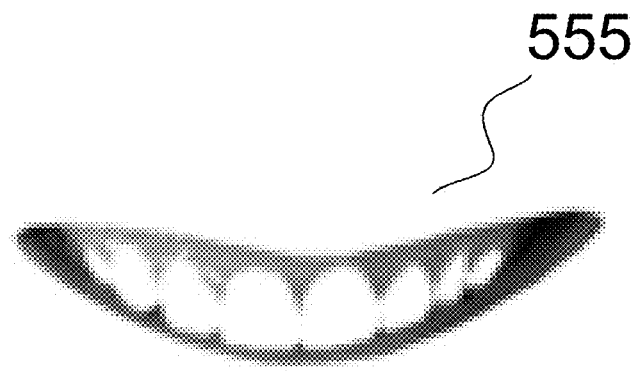
Figure 5D:
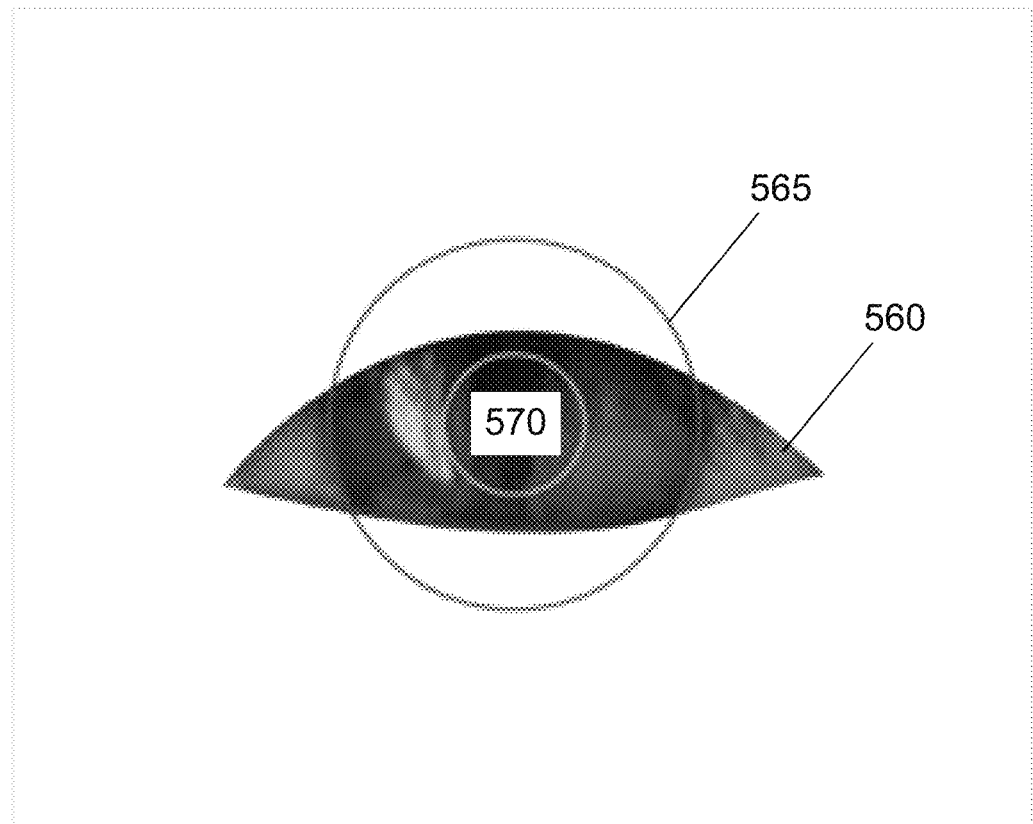
FIG. 5D depicts an exemplary facial image segmentation process in accordance with example embodiments.

At step 510, the server 310 may process the one or more images. In some embodiments, server 310 may process the one or more images by modifying one or more graphic properties of the one or more images. In some embodiments, server 310 may process the one or more images by normalizing movement and/or color information in the one or more images. In some embodiments, the server 310 may process the video data by masking one or more portions of the one or more images. FIGS. 5B-5C depict an exemplary facial image masking and isolating process in accordance with example embodiments. For example, one or more portions of the one or more images may be masked in order to isolate one or more regions of interest, e.g., an eye region and/or a gumline region. For example, areas outside the one or more regions of interest may be masked in image, thereby isolating the one or more regions of interest in each image and simplifying the imaging data for the extraction of signals. A facial image or a portion thereof (e.g., a portion including the mouth) may be processed, e.g., by detecting and mapping a plurality of facial landmarks thereon as discussed with respect to FIG. 2A. For example, landmarks may be applied around the mouth and/or around the teeth. As shown in FIG. 5B, one or more regions may be removed from the facial image to result in a masked image 550. For example, all regions outside of the mouth area may be excluded while retaining the mouth. As shown in FIG. 5C, the teeth may be eliminated from the masked image 550 by color-based thresholding to result in an isolated image 555 that retains the gumline region from which signals may be extracted as further described herein. In some embodiments, the server 310 processes the images by segmenting one or more portions of the one or more images. FIG. 5D depicts an exemplary facial image segmentation process in accordance with example embodiments. For example, one or more portions of the one or more images may be marked with detected boundaries in order to enable precise location of features therein. As shown in FIG. 5D, a masked image of the eye 560 may be segmented by detecting and marking a first boundary 565 indicating a pupil of the eye. Thereafter, the masked image of the eye 560 may be further segmented by locating and marking a second boundary 570 indicating an iris of the eye within the pupil marked by the first boundary 565. Accordingly, the iris may be marked by the boundaries 565 and 570 to enable precise analysis of the iris from which signals may be extracted as further described herein. Furthermore, additional types of processing as described herein (e.g., with respect to step 210 in the method 200) may also be performed.

At step 515, server 310 may extract one or more signals from the one or more images. In some embodiments, server 310 may extract color information from the one or more images. In some embodiments, server 310 may extract color information by extracting or analyzing a Red-Green-Blue (RGB) histogram of the one or more images. In some embodiments, server 310 may extract color information by extracting or analyzing textures in the one or more images. The RBG histogram and/or textures may be extracted using a Gray Level Co-Occurrence Matrix (GLCM). However, additional methods of extracting color information may be utilized herein as would be known to a person having an ordinary level of skill in the art.

At step 520, the server 310 may identify one or more patterns in the extracted signals. In some embodiments, server 310 may use a machine learning algorithm and/or a deep learning model to identify the one or more patterns. For example, the server 310 may utilize a CNN (e.g., one or more first layers of the CNN) to identify one or more patterns in the one or more signals extracted from the facial video recording that are indicative of various health conditions of the subject. However, it should be understood that additional types of machine learning algorithms and/or deep learning models may be utilized as would be known to a person having an ordinary level of skill in the art.

At step 525, the server 310 may determine one or more health measurements based on the one or more identified patterns. In some embodiments, server 310 may employ a machine learning algorithm and/or a deep learning model to determine the one or more health measurements. For example, the server 310 may utilize the CNN (e.g., one or more second layers of the CNN) or other model to determine the one or more health measurements based on the identified patterns. In some embodiments, the one or more health measurements may include a vital sign or measurement. In some embodiments, the one or more health measurements may include a risk threshold or score related to a health condition for the subject.

In some embodiments, the one or more health measurements are selected from the group consisting of blood pressure, systolic blood pressure, diastolic blood pressure, hemoglobin A1C (HbA1C) level, HbA1C risk, oxygen saturation (SpO$_2$), pulse rate, breathing rate, respiration rate, heart rate variability, irregular heartbeat count, body mass index (BMI), cardiovascular disease risks, heart attack risk, stroke risk, hypertension risk, diabetes risk (e.g., Type 2 diabetes), and metabolic health factors.

It should be understood that server 310 may perform several steps of the method 500 multiple times to determine multiple health measurements. For example, after receiving the one or more images, the server 310 may perform steps 510-525 multiple times to determine several health measurements. It should also be understood that a first determined health measurement may be used in calculating additional health measurements of the subject along with the extracted signals. For example, the server 310 may initially determine a heart rate and/or a blood pressure of the subject. Thereafter, the server 310 may determine additional health measurements based on heart rate and/or blood pressure as well any additional extracted signals from the one or more images. For example, heart rate and/or blood pressure (systolic and/or diastolic) may be used as part of a calculation of cardiovascular risk factors, including a risk of heart attack, a risk of stroke, heart rate variability, pulse rate, and other wellness-related metrics. In some embodiments, the one or more additional health measurements are selected from the group consisting of hemoglobin A1C (HbA1C) level, HbA IC risk, blood pressure, systolic blood pressure, diastolic blood pressure, oxygen saturation (SpO$_2$), pulse rate, breathing rate, respiration rate, heart rate variability, irregular heartbeat count, body mass index (BMI), cardiovascular disease risks, heart attack risk, stroke risk, hypertension risk, diabetes risk (e.g., Type 2 diabetes), and metabolic health factors.

The additional health measurements that may be determined by the server 310 as described herein provide an added layer of diagnostic information that enhances the overall risk assessment for the subject as compared to conventional systems. By capturing images of the subject's eye and/or gumline and analyzing the imaging data using a CNN to generate risk thresholds for various health indicators, the systems and methods described herein provide a more comprehensive health risk assessment that goes beyond the assessment provided by classical vital signs alone.

In some embodiments, the methods 200, 400, and/or 500 may be performed by in series. In some embodiments, the methods 200, 400 and/or 500 may be performed in parallel. For example, a single set of imaging data (e.g., facial video and/or images) may be received, thereby completing step 205 of the method 200, step 405 of the method 400, and/or step 505 of the method 500 simultaneously. Thereafter, the methods 200, 400 and/or 500 may be separately completed to calculate different health measurements for the subject. In some embodiments, the determined health measurements from the method 200 and/or 400 may be incorporated into the workflow of the method 500. For example, the system 100 and/or the system 300 may perform the method 200 and/or the method 400 to determine a first health measurement (e.g., a heart rate). Thereafter, the system 300 may complete the method 500 to determine a second health measurement (e.g., cardiovascular risk), wherein the first health measurement is used in the calculation of the second health measurement. Additional workflows incorporating the method 200 and/or the method 400 with the method 500 in series or in parallel are contemplated herein.

Method for Implementing and Training a Machine Learning Algorithm

As disclosed herein, the server 310 may employ a CNN. The CNN may be utilized to process the imaging data, extract features from the imaging data, identify patterns in the extracted features, and/or determine a health measurement for the subject.

Figure 6:
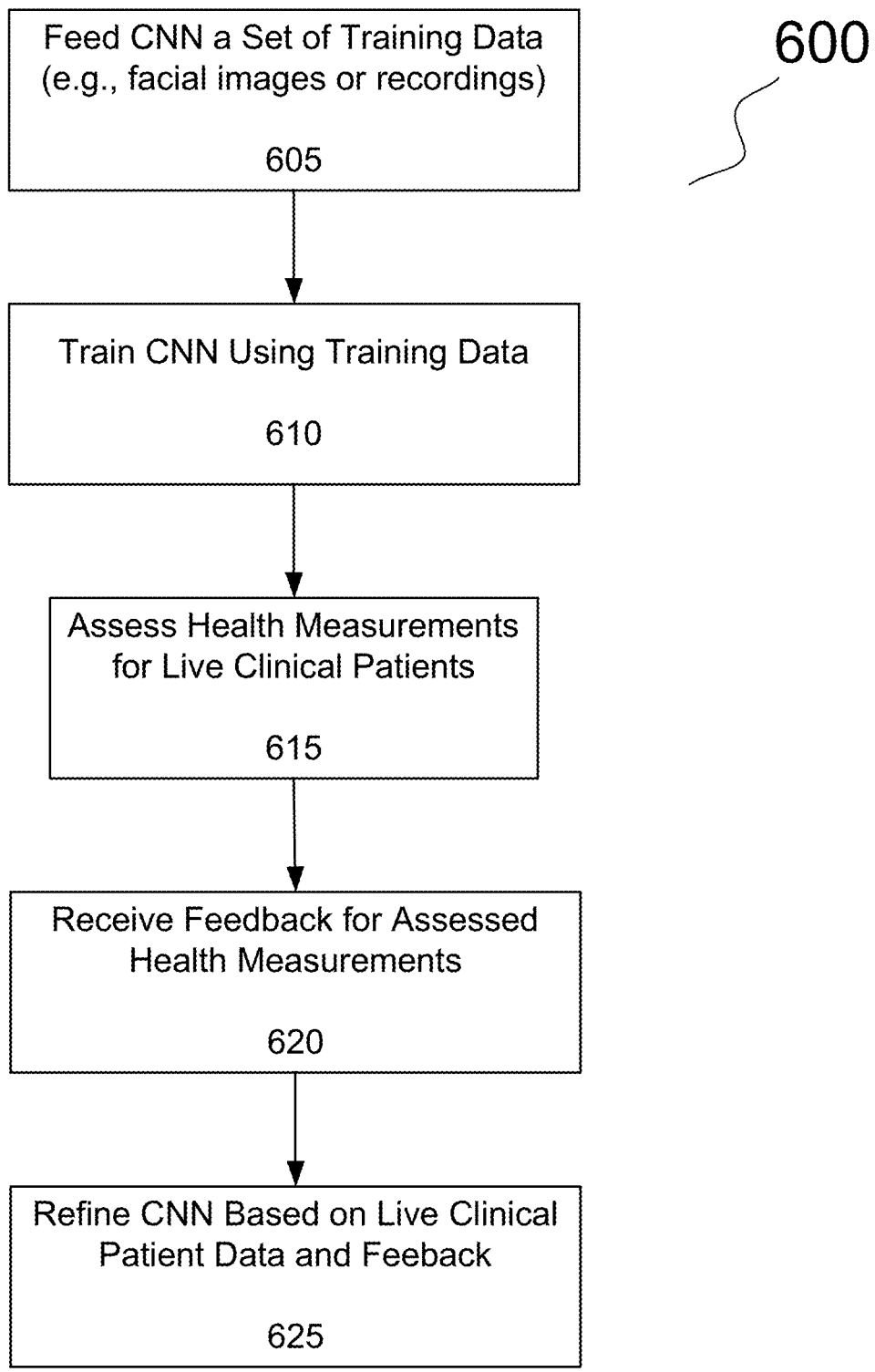
FIG. 6 depicts a flow diagram of an illustrative method for training a machine learning model in accordance with example embodiments.

FIG. 6. is a flow diagram of an illustrative method 600 for implementing and training a machine learning model in accordance with example embodiments.

At step 605, a computing system may generate a training data set for training the CNN. In some embodiments, the training data may include clinical data from historical patients, e.g., facial imaging data. In some embodiments, the training data may include high-resolution facial videos recorded under various lighting conditions and from diverse subjects with different skin tones. The training set may include high-quality imaging data of the skin, the gumline, and/or the eye, which are useful for extracting physiological and metabolic information as described herein. In some embodiments, such as when the training process is a supervised training process, the training data set may further include ground-truth labels. For example, the training data includes facial imaging data as well as corresponding ground-truth measurements for vital signs for the subject. The ground truth labels may be independently determined using clinical-grade testing devices for vitals (e.g., heart rate, blood pressure, and the like), laboratory blood tests, and/or patient questionnaires that provide supplementary information on lifestyle and health conditions, which may assist with risk assessments. For example, clinical-grade devices such as pulse oximeters and blood pressure monitors may be used to collect vital signs such as heart rate, blood pressure, and breathing rate. Further, laboratory blood tests may be used to collect health measurements such as HbA1C and metabolic risk factors. Finally, patient questionnaires may be used to collect information related to medical history (e.g., diabetes and cardiovascular conditions). Supplemental data such as age, gender, and BMI may also be collected and labeled to help the CNN generalize the model across different populations and to personalize health risk predictions.

At step 610, the computing system may train the CNN using the training data set. For example, computing system may train the CNN to learn to extract signals from the facial images and identify patterns in the extracted signals. Furthermore, the training data may be used to train the CNN to determine health measurements based on the identified patterns, e.g., by associating identified patterns with particular vital signs, health conditions, or risks therefor. By training on the labeled training data, the CNN's ability to determine the various health measurements based on the facial imaging data is developed such that it may operate in "live" clinical cases where ground-truths are not known. For example, the CNN may develop the ability to capture subtle changes in skin color caused by blood flow and associate the changes in blood flow with specific health measurements. Over time, the CNN may become more proficient in identifying patterns in the imaging data and/or associating patterns with determined health measurements.

Once trained, the CNN may be used to assess 615 health measurements for "live" clinical patients (i.e., performing the method 200, the method 400, and/or the method 500).

In some embodiments, the model employed in the system undergoes continuous training to achieve ongoing improvements. This dynamic system facilitates perpetual model updates through the integration of live cases as refinement data. By continuously assimilating insights from new patient data, the model undergoes adaptive evolution, responding to changing conditions, and enhancing its predictive capabilities. For example, in some embodiments, method 600 may include steps 620 and 625 in order to continuously improve the CNN.

At step 620, the computing system may receive feedback with respect to the assessed health measurements. For example, following deployment of the CNN for use with method 200, the method 400, and/or the method 500, the computing system may receive feedback on the accuracy of the CNN in analyzing the clinical data of the patient, including imaging data, extracted signals, identified patterns, determined health measurements, and any supplemental data. For example, where a particular health measurement is determined to be incorrect (e.g., by a healthcare provider) or otherwise invalidated, the CNN may obtain an indication of these outcomes and may be trained over time to provide different and/or better predictions or proposals in similar scenarios, thereby improve its pattern recognition and iteratively improve predictions. In another example, where a particular health measurement is confirmed by a healthcare professional or otherwise validated by positive feedback, the CNN may obtain an indication of these outcomes and may be trained over time to provide similar predictions or proposals in similar scenarios, thereby reinforcing the predictive capabilities in analogous situations. Probabilities or risks associated with health conditions may likewise be updated and improved based on accumulated data. Accordingly, live cases may be used to form a second set of dynamic training data, which may be "refinement data" that is used on a continual basis to re-train the machine learning algorithms. Continual integration of refinement data ensures that the machine learning algorithms remain in a perpetual state of training, enhancing their adaptability and performance. This continual learning is processed in the cloud and mobile phone models are updated wirelessly At step 625, the computing system may refine the CNN by further training or fine-tuning the CNN based on the refinement data. For example, the computing system may us the refinement data to further train or refine the CNN to improve its capabilities of extracting signals from the facial images and identifying patterns in the extracted signals In some embodiments, the CNN (e.g., the server 310 in the system 300) may be in communication with a database of medical data (e.g., data from clinical testing as shown in FIG. 3). In some embodiments, the database is a database 320 as described herein with respect to FIG. 3 and may include any of the various types of information discloses with respect to the database 320. The medical data may be accessed from the database 320 to process the images, extract signals, identify patterns, and/or determine health measurements as part of the method 400 and/or the method 500. In some embodiments, the database 320 stores information related to features or patterns of interest, e.g., sample signals, patterns, characteristics, and the like that may be identified in facial images. In some embodiments, the database 320 includes a library of known features or patterns. The known features or patterns may be documented and/or known to be associated with particular vitals, conditions, states, or risk factors for the patient, e.g., through research and/or assessment of images from historical patients. In some embodiments, the database 320 further includes a library of images from historical patients, which may be used for training and/or comparison by the CNN. In some embodiments, the server 310 may access a subset of the library based on known patient parameters (e.g., gender, age, medical history, and the like) such that the server 310 may assess the image based on similar patients using known patient parameters.

Data Processing Systems for Implementing Embodiments Herein

Figure 7:
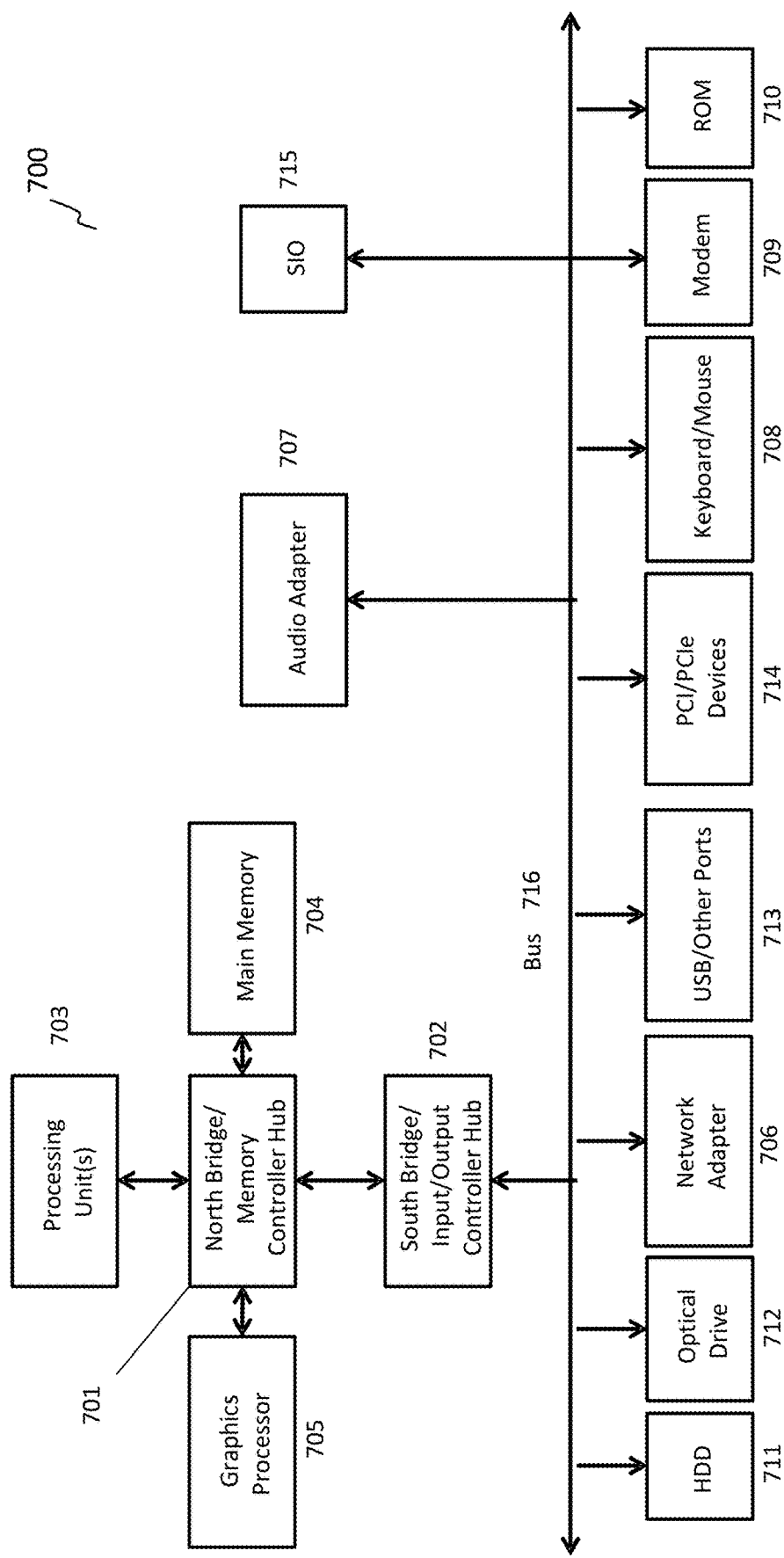
FIG. 7 illustrates a block diagram of an exemplary data processing system in which embodiments are implemented in accordance with example embodiments.

FIG. 7 illustrates a block diagram of an exemplary data processing system 700 in which embodiments are implemented. The data processing system 700 is an example of a computer, such as a server or client, in which computer usable code or instructions implementing the process for illustrative embodiments of the present invention are located. In some embodiments, the data processing system 700 may be a server computing device. For example, data processing system 700 can be implemented in a smartphone, a smart device, a server, or another similar computing device embodying part of the system 100 and/or operably connected to the system 100 as described above. The data processing system 700 can be configured to, for example, transmit and receive information including but not limited to imaging data captured by the system 100, signals extracted from the imaging data by the system 100, and/or determinations related to health measurements made by the system 100.

In the depicted example, data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through, for example, an accelerated graphics port (AGP).

In the depicted example, a network adapter 706 connects to the SB/ICH 702. An audio adapter 707, keyboard and mouse adapter 708, modem 709, read only memory (ROM) 710, hard disk drive (HDD) 711, optical drive (e.g., CD or DVD) 712, universal serial bus (USB) ports and other communication ports 713, and PCI/PCIe devices 714 may connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. A super I/O (SIO) device 715 can be connected to the SB/ICH 702.

An operating system can run on the processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® cServer™ System® running the Advanced Interactive Executive operating system or the Linux operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments described herein can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or the network adapter 706 can include one or more devices that can be used to transmit and receive data.

Those of ordinary skill in the art will appreciate that the hardware depicted in FIG. 7 may vary depending on the implementation. Other internal hardware or peripheral devices, such as flash memory, equivalent non-volatile memory, or optical disk drives may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

This disclosure is not limited to the particular systems, devices and methods described, as these may vary. The terminology used in the description is for the purpose of describing the particular versions or embodiments only and is not intended to limit the scope. Such aspects of the disclosure be embodied in many different forms; rather, these embodiments are provided so that this disclosure will be thorough and complete, and will fully convey its scope to those skilled in the art.

As used in this document, the singular forms "a," "an," and "the" include plural references unless the context clearly dictates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells as well as the range of values greater than or equal to 1 cell and less than or equal to 3 cells. Similarly, a group having 1-5 cells refers to groups having 1, 2, 3, 4, or 5 cells, as well as the range of values greater than or equal to 1 cell and less than or equal to 5 cells, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, structures, or groups thereof, or any members of a claimed group, less than the full measure of this disclosure can be claimed for any reason.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., +10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art. Where the context of the disclosure indicates otherwise, or is inconsistent with such an interpretation, the above-stated interpretation may be modified as would be readily apparent to a person skilled in the art. For example, in a list of numerical values such as "about 49, about 50, about 55", "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). Further, the transitional term "comprising," which is synonymous with "including," "containing," or "characterized by," is inclusive or open-ended and does not exclude additional, unrecited elements or method steps. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

The terms "patient" and "subject" are interchangeable and refer to any living organism. As such, the terms "patient" and "subject" may include, but are not limited to, any non-human mammal, primate or human. A subject can be a mammal such as a primate, for example, a human. The term "subject" includes domesticated animals (e.g., cats, dogs, etc.); livestock (e.g., cattle, horses, swine, sheep, goats, etc.), and laboratory animals (e.g., mice, rabbits, rats, gerbils, guinea pigs, possums, etc.). A patient or subject may be an adult, child or infant.

The term "tissue" refers to any aggregation of similarly specialized cells which are united in the performance of a particular function.

The term "disorder" is used in this disclosure to mean, and is used interchangeably with, the terms "disease," "condition," or "illness," unless otherwise indicated.

The term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

Throughout this disclosure, various patents, patent applications and publications are referenced. The disclosures of these patents, patent applications and publications are incorporated into this disclosure by reference in their entireties in order to more fully describe the state of the art as known to those skilled therein as of the date of this disclosure. This disclosure will govern in the instance that there is any inconsistency between the patents, patent applications and publications cited and this disclosure.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for assessing one or more health measurements of a subject, the system comprising:
   a processor in communication with an imaging device; and
   a non-transitory, computer-readable medium storing instructions that, when executed, cause the processor to:
   receive a video data of a face of the subject from the imaging device, wherein the video data comprises one or more regions of the face, the one or more regions of the face comprising a dermal region,
   extract, using a plane-orthogonal-to-skin method, one or more remote photoplethysmography (rPPG) signals related to the subject from the one or more regions of the video data; and
   determine, using Welch's method applied to the rPPG signals, one or more health measurements of the subject by:
   breaking the rPPG signals into a plurality of smaller portions,
   analyzing each of the plurality of smaller portions of the rPPG signal to determine a frequency of each of the plurality of smaller portions, and
   combining the determined frequency of each of the plurality of smaller portions to determine the one or more health measurements of the subject.

2. The system of claim 1, wherein the one or more regions of the face further comprise an ocular region or a gingival region.

3. The system of claim 1, wherein the instructions that cause the processor to determine the one or more health measurements comprise instructions that, when executed, cause the processor to:
identify, by a first algorithm, one or more patterns in the one or more rPPG signals indicative of a condition of the subject; and
determine, by a second algorithm, the one or more health measurements based on the one or more patterns.

4. The system of claim 1, wherein the one or more health measurements comprises a heart rate of the subject.

5. The system of claim 1, wherein the instructions further cause the processor to:
process the video data prior to extracting the one or more rPPG signals by performing at least one of:
adjusting a resolution of the video data to 720 p; or
adjusting a frame rate of the video data to 29 frames per second.

6. The system of claim 1, wherein the one or more health measurements comprise one or more of heart rate and blood pressure,
wherein the instructions, when executed, further cause the processor to determine, using one or more algorithms, one or more additional health measurements of the subject based on the one or more health measurements and the one or more regions of the face, wherein the one or more additional health measurements are selected from the group consisting of hemoglobin A1C (HbA1C) level, HbA1C risk, oxygen saturation, pulse rate, breathing rate, respiration rate, heart rate variability, irregular heartbeat count, body mass index (BMI), cardiovascular disease risks, heart attack risk, stroke risk, hypertension risk, diabetes risk, and metabolic health factors.

7. The system of claim 1, wherein the instructions further cause the processor to:
process the video data prior to extracting the one or more rPPG signals by masking one or more portions of the video data to isolate the one or more regions of the face in each frame to simplify the video data for the extraction of rPPG signals.

8. The system of claim 1, wherein the instructions that cause the processor to extract, using the plane-orthogonal-to-skin method, one or more remote photoplethysmography (rPPG) signals related to the subject from the one or more regions of the video data further causes the processor to perform operations, where using the plane-orthogonal-to-skin method, the operations comprising:
transforming color information in the rPPG signals to emphasize changes in the color information related to a heart pulse of the subject,
normalizing motion and lighting in the transformed color information to reduce effects of motion and lighting changes in the video data of the subject, and
combining the transformed and normalized color information to maximize information in the color information related to a heart pulse of the subject while reducing and minimizing noise in the color information.

9. A computer-implemented method of assessing one or more health measurements of a subject, the method comprising:
receiving video data of a face of a subject from an imaging device, wherein the video data captures one or more regions of the face comprising a dermal region;
extracting, using a plane-orthogonal-to-skin method, one or more remote photoplethysmography (rPPG) signals related to the subject from the one or more regions of the video data; and
determining, using Welch's method applied to the rPPG signals, one or more health measurements of the subject by:
breaking the rPPG signals into a plurality of smaller portions,
analyzing each of the plurality of smaller portions of the rPPG signal to determine a frequency of each of the plurality of smaller portions, and
combining the determined frequency of each of the plurality of smaller portions to determine the one or more health measurements of the subject.

10. The method of claim 9, wherein the one or more regions of the face further comprise an ocular region or a gingival region.

11. The method of claim 9, and wherein determining, using Welch's method, the one or more health measurements comprises:
identifying, by a first algorithm, one or more patterns in the one or more rPPG signals indicative of a condition of the subject; and
determining, by a second algorithm, the one or more health measurements based on the one or more patterns.

12. The method of claim 9, wherein the one or more health measurements comprises a heart rate of the subject.

13. The method of claim 9, further comprising processing the video data prior to extracting the one or more rPPG signals by performing at least one of:
adjusting a resolution of the video data to 720 p;
adjusting a frame rate of the video data to 29 frames per second; or
masking one or more portions of the video data to isolate the one or more regions in each frame.

14. The method of claim 9, wherein the one or more health measurements comprise one or more of heart rate and blood pressure,
wherein the method further comprises determining, using one or more algorithms, one or more additional health measurements of the subject based on the one or more health measurements and the one or more regions of the face, wherein the one or more additional health measurements are selected from the group consisting of hemoglobin A1C (HbA1C) level, HbA1C risk, oxygen saturation, pulse rate, breathing rate, respiration rate, heart rate variability, irregular heartbeat count, body mass index (BMI), cardiovascular disease risks, heart attack risk, stroke risk, hypertension risk, diabetes risk, and metabolic health factors.

* * * * *